United States Patent

McCready et al.

[15] 3,666,952
[45] May 30, 1972

[54] APPARATUS FOR INDICATING THE POSITION OF A REFERENCE MARKER USED IN A GAMMA RAY CAMERA

[72] Inventors: Victor Ralph McCready, Sutton; Sidney Patrick Newbery, London, both of England

[73] Assignee: National Research Development Corporation, London, England

[22] Filed: Apr. 28, 1970

[21] Appl. No.: 32,647

[30] Foreign Application Priority Data

Apr. 30, 1969 Great Britain...................22,140/69

[52] U.S. Cl..........................250/83.3 R, 250/71.5 R, 315/26
[51] Int. Cl............................................G01t 1/16, G01t 1/20
[58] Field of Search....................250/71.5 S, 83.3 R; 315/22, 315/26

[56] References Cited

UNITED STATES PATENTS

| | | | |
|---|---|---|---|
| 3,118,085 | 1/1964 | Clergue et al............................315/26 |
| 3,502,873 | 3/1970 | Woronowicz.......................250/71.5 S |
| 3,509,341 | 4/1970 | Hindel et al. .......................250/71.5 S |

*Primary Examiner*—Archie R. Borchelt
*Attorney*—Cushman, Darby and Cushman

[57] ABSTRACT

Apparatus for indicating the position of a reference marker is adapted for use with a medical gamma camera. A movable reference marker is coupled to a fixed reference member by an arm, and $x$ and $y$ co-ordinate voltages are generated and fed to a display screen of the gamma camera to produce a reference mark on the screen corresponding to the position of the marker.

8 Claims, 3 Drawing Figures

APPARATUS FOR INDICATING THE POSITION OF A REFERENCE MARKER USED IN A GAMMA RAY CAMERA

The present invention relates to apparatus for indicating a reference position, and is concerned in particular, but not exclusively, with apparatus such as a gamma camera for producing visual images from images formed by radiation in a non-visual wavelength range.

The gamma camera is well established as a reliable instrument for producing visual displays of various organs, following the injection of labelled compounds or radio-active isotopes. In routine clinical use, the instrument has the disadvantage, compared to the rectilinear scanner, of lacking the means of transferring accurately anatomical landmarks to the gamma camera scintigram.

The known technique of using radio-active point sources as anatomical markers results in an ill-defined area of brightness, which may be confused with radio-active areas in the organ under examination. Also it is not possible to transfer to the display continuous lines such as a line indicating the lower edge of the rib cage.

According to the present invention y is provided apparatus for indicating the position of a reference marker comprising a fixed reference member, a movable reference marker coupled to the fixed member in such a manner as to allow movement of the marker relative to the member in two orthogonal directions, and signal generating means coupled between the member and the marker, and arranged to generate a pair of electrical output signals which represent co-ordinates of the position of the marker relative to the fixed member, and which are adapted to be fed to a display system to indicate a reference mark on a display screen.

The pair of electrical signals may represent polar or cartesian co-ordinates.

Conveniently, the movable reference marker may be coupled to the fixed reference member by an arm such as to allow both angular and radial movement of the marker by rotation and radial movement of the arm relative to the fixed member, the signal generating means being coupled between the arm and the fixed member.

The said generating means may comprise a linear potentiometer coupled between the arm and the fixed member and arranged to provide a voltage proportional to the distance between the marker and the fixed member, and a rotating potentiometer coupled to rotate with rotation of the arm about the fixed member and arranged to produce, for constant values of the said distance between the marker and the fixed member, a pair of voltages proportional respectively to the sine and co-sine of the angle of rotation of the arm, the two potentiometers being connected to combine the linear and angular voltages to provide as the said pair of electrical signals a pair of voltages proportional respectively to the product of the said distance and the sine of the said angle, and to the product of the said distance and the co-sine of the said angle.

Thus a co-ordinate transfer system embodying the invention may use a display oscilloscope beam to draw lines or a cross on a Polaroid picture in the correct anatomical position in relation to the crystal surface.

There is also provided in accordance with the present invention apparatus for producing visual images comprising means for detecting an image formed by radiation in a non-visual wavelength range, a display system for displaying the said image as a visual picture on a display screen, and position indicating apparatus for generating a pair of electrical output signals which represent co-ordinates of a reference position in the field of view of the detecting means, the position indicating apparatus being connected to feed the said output signals therefrom to the display system to produce on the display screen, a reference mark to allow correlation between features in the field of view of the detecting means and features shown on the said visual picture.

It will be appreciated that the electrical signals representing co-ordinates of the reference position to be displayed need not be produced only by a reference marker coupled by an arm to the generating means, but may be provided by other co-ordinate generating systems. For example, two linear potentiometers positioned orthogonally to provide a frame of reference in the field view of the gamma camera may be coupled to the reference marker by a pair of orthogonal arms which pick off directly $x$ and $y$ voltages representing the co-ordinates. The arms may be coupled to sliding taps on the linear potentiometer so as to allow movement of the reference marker in two orthogonal directions.

Embodiments may be constructed as ancillary attachments to a camera and can be removed completely in seconds, or moved to one side to permit changing of collimators. The use of such apparatus does not impair the normal circuit operation of the camera, and it can be connected in such a way that a required rotation of the picture on the oscilloscope screen also alters the reference points of the transfer system.

An embodiment of the invention will now be described by way of example with reference to the accompanying drawings in which.

Figure 1:
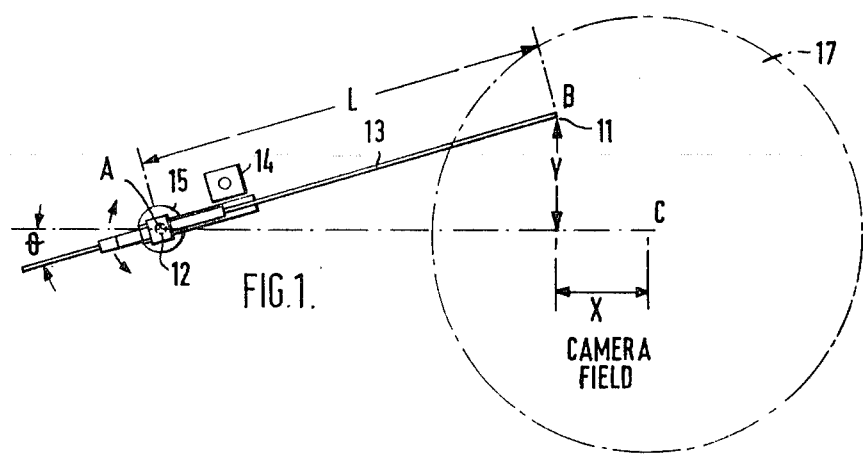
FIG. 1 is a diagrammatic representation of apparatus for indicating the position of a reference marker, illustrating the geometrical relationship between polar and cartesian co-ordinates.
Figure 3:
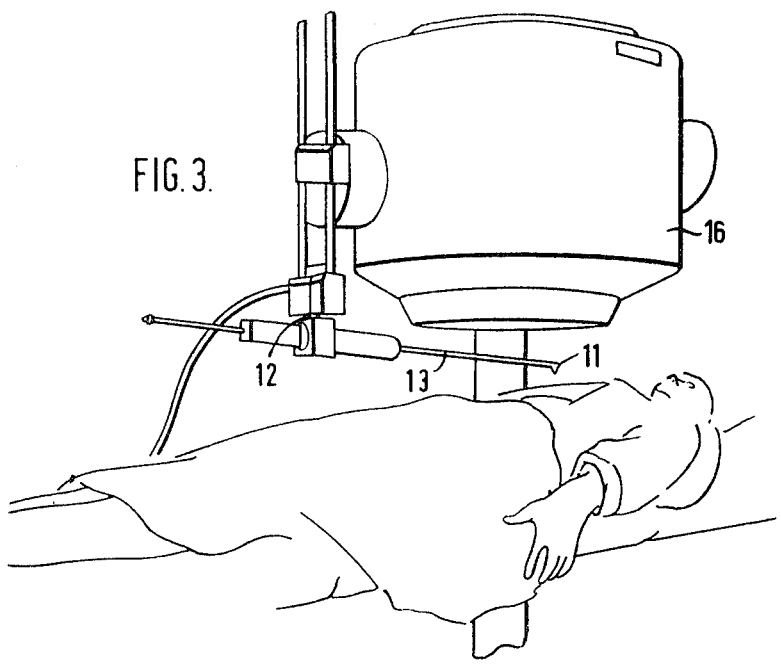
FIG. 3 is a perspective view of the apparatus of FIG. 1.

Referring to FIGS. 1 and 3, a movable reference marker 11 is coupled to a fixed reference member 12 by an arm 13. The arm 13 is free to rotate about the member 12 and to move radially relative to the member 12 to allow the marker 11 to move in a plane perpendicular to the member 12. The plane of movement will normally be horizontal. The arm may also be provided with a vertical adjustment by movement of the coupling means vertically at the member 12, but such movement is not intended to be detected by the present embodiment.

A linear potentiometer 14 is coupled between the arm 13 and the fixed member 12, and is arranged to provide a voltage proportional to the distance between the marker 11 and the fixed member 12. A rotating potentiometer 15 is coupled between the arm 13 and the fixed member 12 and arranged to rotate with rotation of the arm 13. The rotating potentiometer 15 is arranged to provide, for a fixed value of the distance between the marker 11 and the member 12, a pair of voltages proportional respectively to the sine and co-sine of the angle of rotation of the arm 13 relative to a fixed angular reference.

In use, with a gamma camera 16, the marker 11 is placed at a required anatomical landmark on the patient within the range 17 of the camera, and the voltages from the potentiometers 14 and 15 are applied (as will be explained with reference to FIG. 2) to produce a visible reference mark on the visual display screen which normally displays a picture derived from the camera 16.

Referring to FIG. 1, the position of the marker 11 at point B relative to a point A at the member 12 may be described by polar co-ordinates L and $\theta$ where L is the distance between the points A and B and $\theta$ is the angle of rotation of the arm 13 from an angular reference. The position may also be described in rectangular co-ordinates X and Y relative to a point C at the center of the field of the camera 16, where $X = L \cos \theta - AC$ and $Y = L \sin \theta$. A voltage proportional to L is generated by altering the setting of the linear potentiometer 14 and voltages proportional to $L \cos \theta$ and $L \sin \theta$ are obtained from the rotating sine/co-sine potentiometer 15 at the point A. A voltage proportional to $AC$, which is constant, is added algebraically to the voltage proportional to $L \sin \theta$. Thus voltage analogues proportional to $X$ and $Y$ can be fed to a display oscilloscope normally displaying a picture from the camera 16.

For continuous lines such as the costal margin or the edge of a mass, a train of pulses at approximately 10 kHZ is used for brightening purposes. Alternatively when single anatomical points are being recorded, a small deflecting voltage having a triangular waveform is fed alternately to the oscilloscope $X$ and $Y$ deflection amplifiers simultaneously with a train of brightening pulses. This produces a small cross in the desired position.

Figure 2:
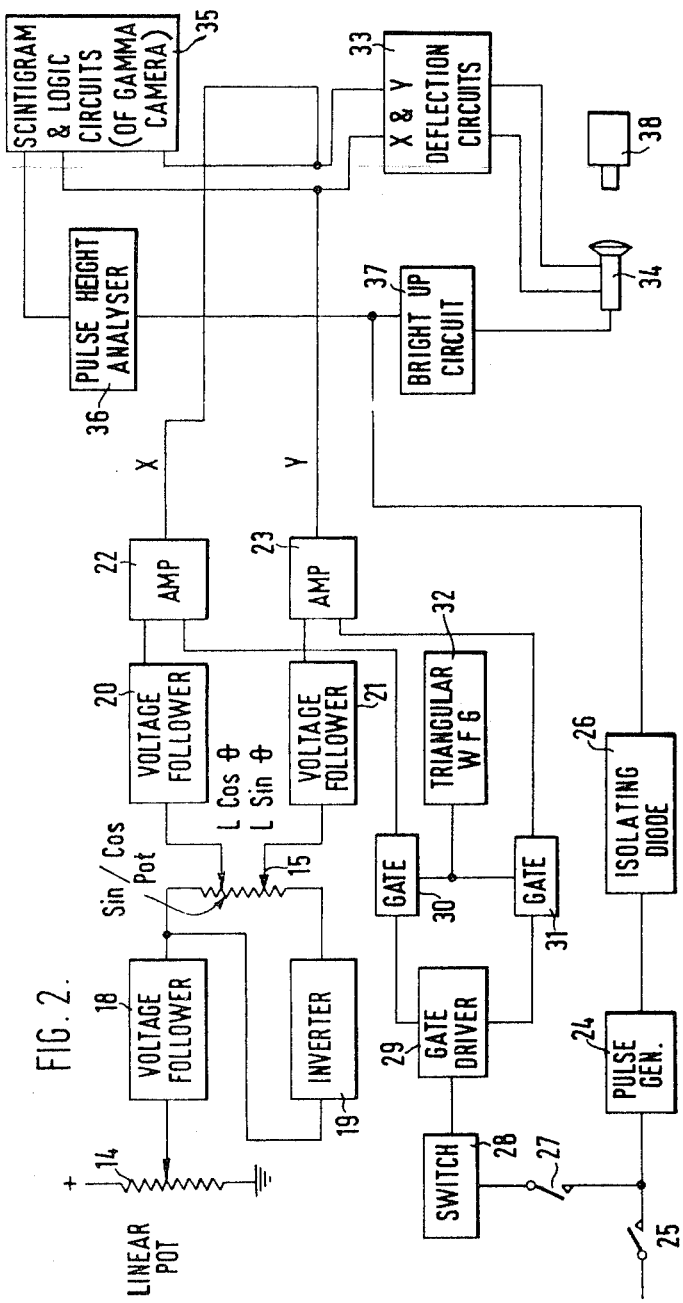
FIG. 2 is a block circuit diagram of an electrical circuit for use with the apparatus of FIG. 1.

Referring to FIG. 2, the output of the linear potentiometer 14 is fed to a voltage follower circuit 18. The output of the voltage follower circuit is fed directly to one terminal of the sine/co-sine potentiometer 15 and is also fed through an inverter 19 to a second terminal of the potentiometer 15. Voltages proportional to $L \cos \theta$ and $L \sin \theta$ are taken from the potentiometer 15 and fed respectively to voltage follower circuits 20 and 21. The outputs of the circuits 20 and 21 are amplified in amplifiers 22 and 23 respectively and fed to the $x$ and $y$ deflection circuit 33 of the display device 34 which normally receive from the gamma camera scintigram 35 $x$ and $y$ coordinate signals representing features to be displayed. In known gamma cameras the $x$ and $y$ coordinate signals are produced by combining in logic circuits the outputs of an array of photomultipliers behind the crystal of the gamma camera. The photomultiplier signals are also combined to give the so-called z-pulses which are proportional to the total energy of each interaction of radiation with the scintigram crystal. The z-pulses are fed to a pulse height analyzer 36 which selects the wavelength range of radiation which is of interest and passes the appropriate $z$ pulses to the bright up circuit 37 of the display device 34. The image on the display device 34 is then photographed by a photographic camera 38 over an exposure time for example between 1 and 4 minutes.

The circuit 37 controlling the brightening of the display device 34 can be operated to indicate the position of the reference marker 11 in two modes, by the production of continuous lines and crosses respectively.

A 10 kHZ pulse generator 24 is energized by closing a switch 25 and is connected to feed negative going $3\mu s$ pulses (e.g. from +6 volts to 0 volts) through an isolating diode 26 to the bright-up circuit 37 of the display device 34. This connection simulates the z pulses from the analyzer 36 and provides a train of pulses needed to produce reference lines on the display device.

Continuous lines are formed by following lines on the patient with a marker 11 and depressing the switch 25 so that a continuous train of bright-up pulses produces in effect a continuous line on the display oscilloscope of the gamma camera. This is used when it is required to draw circles or straight lines, or outline various parts of the patient. Although the lines are continuous in the sense that they are not interrupted during drawing, they are instantaneous unless storage facility is provided in the display system.

A second switch 27 energizes a further switching circuit 28 comprising a square wave generator which controls a gate driver circuit 29. The gate driver circuit 29 opens alternately two gates 30 and 31 to which are applied signals from a triangular waveform generator 32. The outputs of the gates 30 and 31 are connected to second inputs of the amplifiers 22 and 23 respectively and operate in the second mode of the apparatus for producing crosses on the display device 34. Thus when the switches 25 and 27 are both closed, the brightening pulses are applied as above in the first mode, but in addition, a triangular waveform is fed alternately through the gates 30 and 31 to the $X$ and $Y$ amplifiers 22 and 23, thus providing the deflection voltages to form a cross which is used to mark the required anatomical point on the display device 34.

In use, the device is calibrated initially by placing collimated radioactive sources at the edges and center of the crystal which is sensitive to the gamma rays and which lies within the detector head of the gamma camera 16 behind the lead collimator. The gain and shift settings of the apparatus are then adjusted so that the position of the marks generated by the apparatus are coincident with the images of the sources. For accurate operation of the apparatus, the gain of the camera amplifiers must remain constant. Periodic use of the calibrating procedure outlined above is used to detect any departure from normal.

During use of the apparatus of FIG. 2 to provide reference marks on the display device 34, the output from the scintigram 35 is entailed and the camera 38 is left on. Although the generation of a straight line, say, in the first mode, does not produce a stored image on the display device 34, a stored line is recorded at the camera 38 due to the relatively long exposure time.

To operate the device after calibration, the detector 16 is retracted a few inches from the patient, the arm 13 is tilted slightly downwards, and the marker 11 is placed over the desired position on the patient.

The apparatus described is suitable for use with a parallel collimator in the detector head 16, as the magnification of the image is independent of the distance of the camera from the object observed. In the case of a pin-hole collimator, however, the magnification of the image is inversely proportional to distance between the camera and the object. Since the relationship between movements of the probe 11 and movements of the reference mark on the screen are constant, the reference mark would no longer be accurately positioned. This difficulty is overcome in a modified embodiment of the invention (not shown) in which a variable gain inverting amplifier is connected before the voltage follower 18. A correction factor to be applied to this amplifier is then worked out using a template of say an inch square of metal at various distances from the camera. The gain of the inverting amplifier is then varied inversely with the camera to object distance to ensure that movements of the reference mark on the display are in proportion to features of the field of view magnified by the camera 16.

We claim:

1. Apparatus for producing visual images comprising means for detecting an image formed by radiation in a non visual wavelength range, a display system for displaying the said image as a visual picture on a display screen, and position indicating apparatus for generating a pair of electrical output signals which represent coordinates of a reference position in the field of view of the detecting means, the position indicating apparatus being connected to feed the said output signals therefrom to the display system to produce on the display screen, a reference mark to allow correlation between features in the field of view of the detecting means and features shown on the said visual picture.

2. Apparatus according to claim 1 in which the position indicating apparatus comprises
   a fixed reference member,
   a movable reference marker coupled to the fixed member in such a manner as to allow movement of the marker relative to the member in two orthogonal directions, and
   signal generating means coupled between the member and the marker, and arranged to generate a pair of electrical output signals which represent co-ordinates of the position of the marker relative to the fixed member, and which are adapted to be fed to a display system to indicate a reference mark on a display screen.

3. Apparatus according to claim 2 in which the movable reference marker is coupled to the fixed reference member by an arm such as to allow both angular and radial movement of the marker by rotation and radial movement of the arm relative to the fixed member, the signal generating means being coupled between the arm and the fixed member.

4. Apparatus according to claim 3 in which the said generating means comprises a linear potentiometer coupled between the arm and the fixed member and arranged to provide a voltage proportional to the distance between the marker and the fixed member, and a rotating potentiometer coupled to rotate with rotation of the arm about the fixed member and arranged to produce, for constant values of the said distance between the marker and the fixed member, a pair of voltages proportional respectively to the sine and co-sine of the angle of rotation of the arm, the two potentiometers being connected to combine the linear and angular voltages to provide as the said pair of electrical signals a pair of voltages proportional respectively to the product of the said distance and the sine of the said angle, and to the product of the said distance and the cosine of the said angle.

5. Apparatus according to claim 1 including means for adding to each of the said output signals a periodic triangular waveform arranged to generate in operation a cross as the reference mark on the said display screen.

6. Apparatus according to claim 2 including means for supplying, in operation, to the said display system, a series of periodic pulses to control brightening of the display screen so as to produce a continuous line when the reference marker is moved relative to the fixed reference member.

7. Apparatus according to claim 1 in which the said detecting means comprises a gamma camera for medical use.

8. Apparatus according to claim 1 including means for forming a stored image of the picture and means for inhibiting the display system from displaying a picture from the detecting means while the position indicating apparatus is energized to produce the said reference mark on the said display screen.

* * * * *